(12) United States Patent
Nakamura

(10) Patent No.: US 7,460,062 B2
(45) Date of Patent: Dec. 2, 2008

(54) SIGNAL PROCESSING APPARATUS

(75) Inventor: Mitsuo Nakamura, Nagoya (JP)

(73) Assignee: Denso Corporation, Kariya (JP)

( * ) Notice: Subject to any disclaimer, the term of this patent is extended or adjusted under 35 U.S.C. 154(b) by 40 days.

(21) Appl. No.: 11/823,821

(22) Filed: Jun. 28, 2007

(65) Prior Publication Data

US 2008/0150780 A1  Jun. 26, 2008

(30) Foreign Application Priority Data

Jul. 27, 2006 (JP) ............... 2006-205301

(51) Int. Cl.
*G01S 13/00* (2006.01)
*G01S 13/08* (2006.01)

(52) U.S. Cl. ............... 342/195; 342/118
(58) Field of Classification Search ........... 342/195, 342/118
See application file for complete search history.

(56) References Cited

U.S. PATENT DOCUMENTS

| 6,281,834 B1 * | 8/2001 | Stilp | 342/174 |
| 6,492,944 B1 * | 12/2002 | Stilp | 342/387 |
| 2002/0080069 A1 * | 6/2002 | Stilp et al. | 342/387 |
| 2003/0058930 A1 * | 3/2003 | Sawada et al. | 375/233 |
| 2003/0067975 A1 * | 4/2003 | Yamakura et al. | 375/233 |
| 2004/0169840 A1 | 9/2004 | Hoashi et al. | |
| 2005/0200833 A1 | 9/2005 | Nakamura et al. | |
| 2007/0040728 A1 * | 2/2007 | Nishimura et al. | 342/70 |
| 2008/0030398 A1 * | 2/2008 | Nakamura | 342/118 |
| 2008/0150780 A1 * | 6/2008 | Nakamura | 341/155 |

FOREIGN PATENT DOCUMENTS

JP  2008032498 A * 2/2008

* cited by examiner

*Primary Examiner*—John B Sotomayor
(74) *Attorney, Agent, or Firm*—Harness, Dickey & Pierce, PLC

(57) ABSTRACT

A first AD converter subjects an analog signal to AD conversion by a first AD clock, and a second AD converter subjects the same analog signal to AD conversion by a second AD clock that is shifted in phase from the first AD clock by half cycle. FF circuits store the AD conversion results of the first AD converter and the second AD converter by the first AD clock and the second AD clock, respectively. FF circuits store the data of the FF circuits by the first AD clock, separately. A DPRAM writes the respective data that are stored by the FF circuits by the first AD clock as a group of data, divides the group of written data into the respective data, and reads the respective data by a logic clock in twice to output the data to an integration circuit.

5 Claims, 7 Drawing Sheets

SIGNAL PROCESSING APPARATUS

CROSS REFERENCE TO RELATED APPLICATION

This application is based on and incorporates herein by reference Japanese Patent Application No. 2006-205301 filed on Jul. 27, 2006.

FIELD OF THE INVENTION

The present invention relates to a signal processing apparatus, and more particularly to a vehicle radar device that irradiates a transmitting wave within a given angle range, and detects a reflecting object on the basis of a receiving signal of a reflected wave of the transmitting wave when receiving the reflected wave. The present invention can be applied to a radar device other than the radar device.

BACKGROUND OF THE INVENTION

In a conventional radar device, a laser beam is irradiated, and a distance to a reflecting object is measured on the basis of a peak of a receiving signal waveform resulting from the irradiated laser beam as disclosed in US 2004/0169840 A1 (JP 2004-177350A) or US 2005/0200833 A1 (JP 2005-257405A). According to this device, a time difference (peak time) between a time at which the laser beam is emitted and a peak of the receiving signal is measured to calculate the distance to the reflecting object by the following expression.

Distance=Peak time×Laser beam velocity/2     (Ex. 1)

In the case of measuring the peak time, a time difference between a time at which laser emission starts and a center (peak center) of the peak waveform of the receiving signal is calculated by conducting analog signal processing. Alternatively, the receiving signal is subjected to analog-to-digital (AD) conversion, the peak center is found in a digital manner, and a period of time after the time at which the laser emission starts is calculated.

In those calculation methods, the peak center in the digital manner is found in an integrating process for the purpose of improving the S/N ratio of the receiving signal as disclosed in US 2004/0169840 A1. The integrating process means a process of adding a given number of receiving signals from the same reflecting object. The N adding processes are conducted on the receiving signals from the same reflecting object, thereby increasing the intensity of the reflection peak by N times. Since the intensity of the random noise signal increases $\sqrt{N}$ times, only the reflection peak is so emphasized as to distinguish the reflection peak from the random noise. The integrating process is effective in extracting the peak of the reflection signal with emphasis under the circumstances where the intensity of the reflection peak is low and cannot distinguish from the random noise.

In the integrating process, the receiving signal that has been converted into the digital signal by the AD conversion is integrated. This is because the receiving signals that are different in the receiving time from each other are added together in the integrating process, it is necessary to record the addition results of the past receiving signals, and the recording of the addition results can be readily realized by recording the receiving signals that have been converted into the digital signals.

FIG. 2C of US 2004/0169840A1 discloses the configuration of realizing the integrating operation by an AD converter circuit. Because the AD converter circuit realizes sampling with skipping every sampling period, the center position of the peak waveform of the receiving signal is not always sampled. Under the circumstances, in the case of using the AD converter circuit, it is necessary to estimate the center of the peak waveform on the basis of the sampling results. That is, it is necessary to extract the peak center from the waveform whose peak is emphasized by integration.

FIG. 4B of US 2004/0169840 A1 discloses a method of estimating the peak center, and FIG. 14B of US 2005/0200833 A1 (JP2005-257405) shows a specific method of estimating the peak center. A description will be given of a method of estimating the peak center with reference to FIG. 14B of US 2005/0200833 A1. As shown in US 2005/0200833 A1, a constant threshold value is first set with respect to the peak waveform that is obtained by the integrating process to obtain two cross points of the peak waveform and the threshold value. The threshold value is obtained by multiplying the maximum value of the peak waveform (maximum value of the integrated values of the AD conversion results) by a coefficient k that satisfies 0<k<1.

In order to find the cross points of the peak waveform and the threshold value, two points which are larger and smaller than the threshold value are detected. For example, the threshold value is interposed between two points of (t1, a1) and (t2, a2) in FIG. 14B at a leading portion of the peak waveform, and the threshold value is vertically interposed between two points of (t3, a3) and (t4, a4) at a trailing portion of the peak waveform.

The tx (x=1, 2, 3, 4) of (tx, ax) represents an elapsed time from a laser emission start, and is located on a sampling point of the AD conversion. Also, ax (x=1, 2, 3, 4) is an integration results of the receiving signals on the tx point. The two points between which the threshold value is interposed are connected by a line, and when cross points between the threshold value and the line on the time axis are T1 and T2, T1 and T2 are calculated by the following expression, in which Th represents a threshold.

$T1=(Th-a1) \times (t2-t1)/(a2-a1)+t1$     Ex. 2

$T2=(a3-Th) \times (t4-t3)/(a3-a4)+t3$     Ex. 3

When T1 and T2 are determined, the peak waveform center time is estimated by calculating the following expression.

Peak center estimate time=$(T1+T2)/2$     Ex. 4

In the above conventional radar device, because the above Expression 1 is calculated on the basis of the peak center estimate time that is calculated by the above Expression 4 to measure the distance to the reflecting object, the estimate precision of the peak center estimate time is a precision of the distance calculation as it is. Therefore, in the case where the interval of the sampling point of the AD conversion is long with respect to the peak width of the peak waveform, an error in the estimate time that is calculated in the above Expression 4 becomes large.

In order to quantitatively evaluate the estimate error of the peak center estimate time, the Gauss waveform is used in a model of the peak waveform for consideration. The Gauss waveform is represented by the following expression, and is readily quantitatively dealt with.

Gauss waveform $(t)=\exp\{-a \times (t-b) \times (t-b)\}$     Ex. 5

Symbol "b" in the above Expression 5 is a parameter that gives a peak waveform center (PC) position. FIG. 8A shows models of two peak waveforms that are different in the peak center position using the Gauss waveform represented in the above Expression 5 together. In FIG. 8A, plural vertical lines that are in parallel to the axis of ordinate represent a time of the sampling point of the AD conversion. The AD conversion result outputs the peak values at points where the plural vertical lines cross the waveform. A left waveform of FIG. 8A is located at a position where the peak center PC is sampled, and a right waveform is located at a position where the peak center PC is not sampled.

The AD conversion results (dots on the graph) of the waveform shown in FIG. 8A is shown in FIG. 8B as being connected by an interpolation curve on the original waveforms. In the right peak waveform (a waveform whose peak center PC is not sampled) shown in FIG. 8B, the graph connected by the interpolation curve shown by a solid line is deviated from the original waveform shown by a dotted line. This deviation becomes more remarkable as the sampling interval becomes longer than the peak width.

The left peak waveform of FIG. 8B (waveform whose peak center is sampled) is shown in FIG. 8C together with the set threshold value (coefficient k=0.625). The threshold value on the peak leading portion of the peak waveform is interposed between two points (t1, a1) and (t2, a2), and the threshold value on the peak trailing portion is interposed between two points (t2, a2) and (t3, a3). T1 and T2 are calculated by using the values of two points at each of the two portions on the leading portion and the trailing portion of the peak waveform, and the peak center estimate time is calculated on the basis of the above Expression 4. The calculation results coincide with the actual peak center. This is because, in the case of the peak waveform shown in FIG. 8C, since the peak center is sampled by the AD conversion, the peak waveform is symmetrical with respect to the sampling point with the result that T1 and T2 are positioned symmetrically with respect to the peak center.

The right peak waveform of FIG. 8B (waveform whose peak center is not sampled) is shown in FIG. 8D together with the set threshold value (coefficient k=0.625). The threshold value on the leading portion of the peak waveform is interposed between two points (t1, a1) and (t2, a2), and the threshold value on the peak trailing portion is interposed between two points (t3, a3) and (t4, a4). T1 and T2 are calculated by using the values of two points at each of the two portions on the leading portion and the trailing portion of the peak waveform, and the peak center estimate time is calculated on the basis of the above Expression 4. As is understood from the asymmetry of the curve connected by the interpolation curve, the calculation results do not coincide with the actual peak center. Therefore, in the case of the peak waveform whose peak center is not sampled, even if the original waveform is going to be restored by connecting the sampled points, the sampling points are asymmetrical with respect to the peak center. As a result, the peak center estimate time that is estimated by calculating the above Expression 4 does not coincide with the actual peak center.

SUMMARY OF THE INVENTION

The present invention therefore has an object to provide a signal processing apparatus, which is capable of reducing an error in the calculation distance.

It is proposed to increase the sampling frequency of the AD conversion, that is, to shorten the sampling interval. As the sampling frequency is more increased, the peak center estimate time in the case where the peak center is not sampled more coincides with the actual peak center. In the case that is used in the actual radar device, it is impossible to increase the sampling frequency unlimitedly due to various limitations on the circuit.

Although it is impossible to increase the sampling frequency unlimitedly, when the sampling frequency can be made higher than the upper limit of the sampling frequency which is determined according to the various limits on the circuit, it is possible to reduce the estimate error of the peak center estimate time (that is, a precision in the distance calculation can be enhanced). As a result, the advantages are great.

If the peak waveform shown in FIG. 8B is sampled at twice the sampling frequency, the sampling points are doubled as shown in FIG. 9A. In order to quantitatively evaluate the effects in the case where the peak waveform is sampled at twice the frequency, a deviation time between the peak center estimate time that is estimated by the above Expression 4 and the actual peak center time is converted into the distance through the above Expression 1 for comparison. The reason why the peak center estimate deviation time is converted into the distance error for comparison is because a difference as the performance of the sensor is readily understandable when not the time deviation but the distance error is indicated.

If the sampling is conducted at the sampling intervals shown in FIG. 8B, the deviation time between the calculation result of the above Expression 4 and the actual peak center is converted into the distance as shown in FIG. 9B. On the other hand, if the sampling is conducted at the sampling intervals shown in FIG. 9A the deviation time between the calculation result of the above Expression 4 and the actual peak center is converted into the distance as shown in FIG. 9C. The distance on the axis of abscissa in FIGS. 9B and 9C is a distance from the radar device to the reflecting object. The calculation error on the axis of ordinate is obtained by converting the peak estimate deviation of the receiving signal waveform from the reflecting object into the distance.

In the case of FIG. 9B, an error of about 0.25 [m] occurs at maximum in terms of the distance. In the case of FIG. 9C, the error falls within about 0.01 [m] at maximum. Also, when the waveforms of the calculation error are compared between FIG. 9B and FIG. 9C, it is understood that there is a definite difference in the sensor performance. In the case of FIG. 9B, the error is greatly affected by a position at which the reflecting object exists. In the case of FIG. 9C, the error is hardly affected by the position at which the reflecting object exists.

That is, it is found that the distance error can be considerably reduced by merely doubling the sampling frequency. The error results shown in FIG. 9C are obtained in the case where the Gauss waveform is the peak waveform, and the sampling frequency is 40 M[Hz]. However, it is possible to easily estimate that the effect of reducing the distance error is obtained even if the peak waveform is other configurations other than the Gauss waveform, or another sampling frequency is used.

From the above consideration, when sampling can be realized at the sampling frequency twice as large as the upper limit while the limit of the upper limit of the sampling frequency is maintained in the circuit used in the actual radar device, it is possible to enhance the distance calculation performance of the radar device. That is, it is possible to reduce the error in the calculated distance which is caused by the sampling frequency of the AD conversion.

For attaining the above object and function, according to a signal processing apparatus of the present invention, a plurality of AD clocks that are equal in frequency and different in phase are generated for sampling of AD conversion. An analog signal is AD converted into digital signals by a plurality of AD converters at different timing of the AD clocks. Data of respective AD conversion results are stored first at the timing of different AD clocks of the respective AD conversions. The stored data are then stored at the timing of one AD clock, which is one of the AD clocks used for the first storing operation. The respective data stored at the same timing are written as a group of data at the same timing of the same AD clock. The grouped written data are divided and read out at timings of clocks different from the AD clocks. The data thus read out are subjected to predetermined signal processing at the same timing as the timing of reading out the data.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
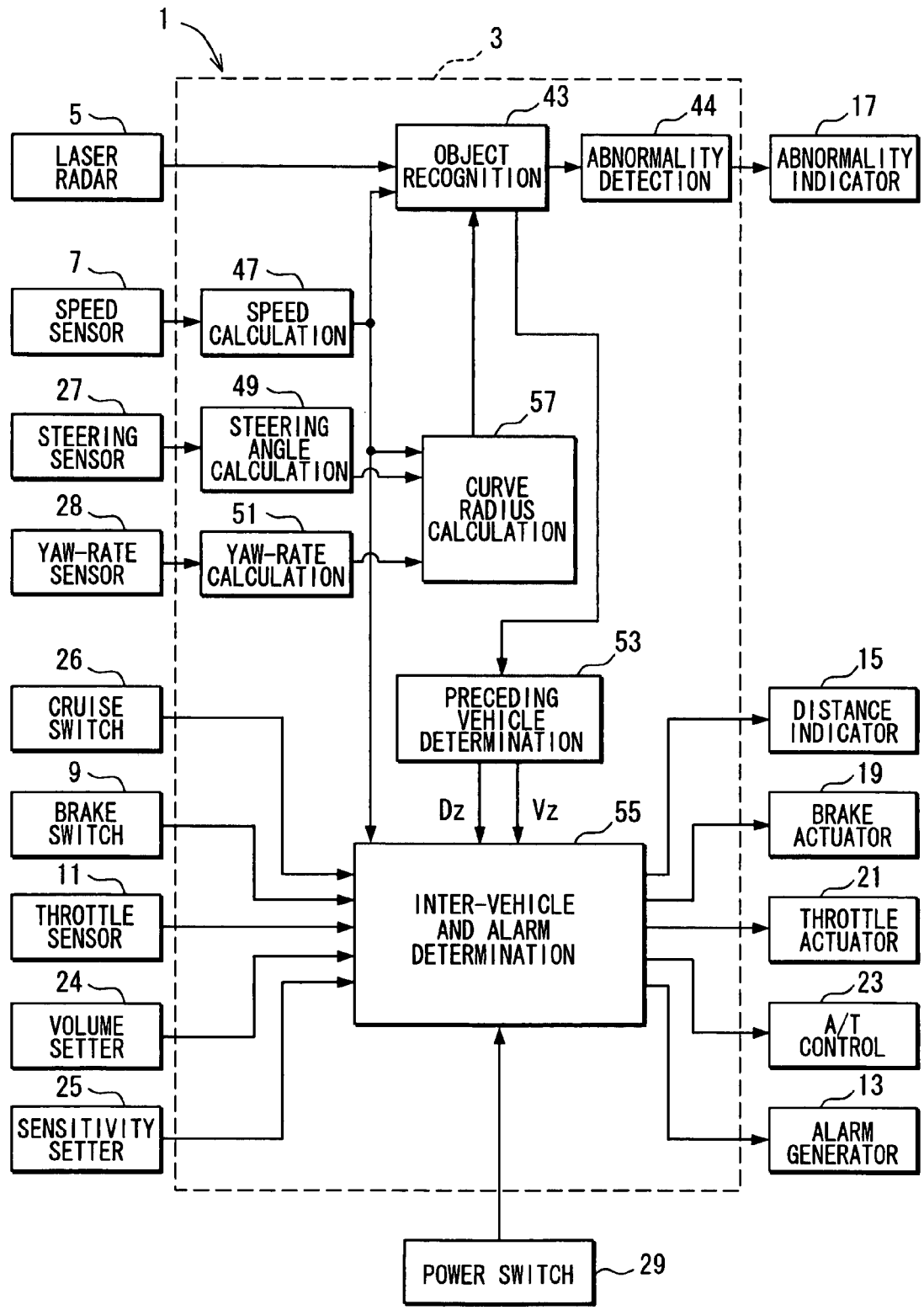
FIG. 1 is a block diagram showing a vehicle control device to which a signal processing apparatus according to the present invention is applied.

Referring to FIG. 1, a vehicle radar apparatus according to this embodiment is applied to a vehicle control device 1. The vehicle radar apparatus has a function of controlling a vehicle speed in order to issue an alarm in the case where an obstacle exists in an area within a given distance, or to keep an inter-vehicle distance to a preceding vehicle to a given inter-vehicle distance. The obstacle or the preceding vehicle is a reflecting object of the laser beam.

The vehicle control device 1 mainly includes a recognition/inter-vehicle control ECU 3. The control ECU 3 mainly includes a microcomputer, an input/output interface (I/O), various driver circuits and detector circuits. Those hardware configurations are well known, and therefore their description will be omitted.

The control ECU 3 receives detection signals from a laser radar sensor 5 as a vehicle radar apparatus, a vehicle speed sensor 7, a brake switch 9, and a throttle position sensor 11. The control ECU 3 also outputs drive signals to an alarm generator 13, a distance indicator 15, a sensor abnormality indicator 17, a brake actuator 19, a throttle actuator 21, and an automatic transmission (A/T) controller 23.

Also, the control ECU 3 is connected with an alarm volume setter 24 that sets an alarm volume, an alarm sensitivity setter 25 that sets the sensitivity in an alarm determination process, a cruise control switch 26, a steering sensor 27 that detects the operation amount of a steering wheel (not shown), and a yaw-rate sensor 28 that detects a yaw-rate generated in a vehicle. Also, the control ECU 3 has a power switch 29, and starts given processing upon turning on the power switch 29.

Figure 2:
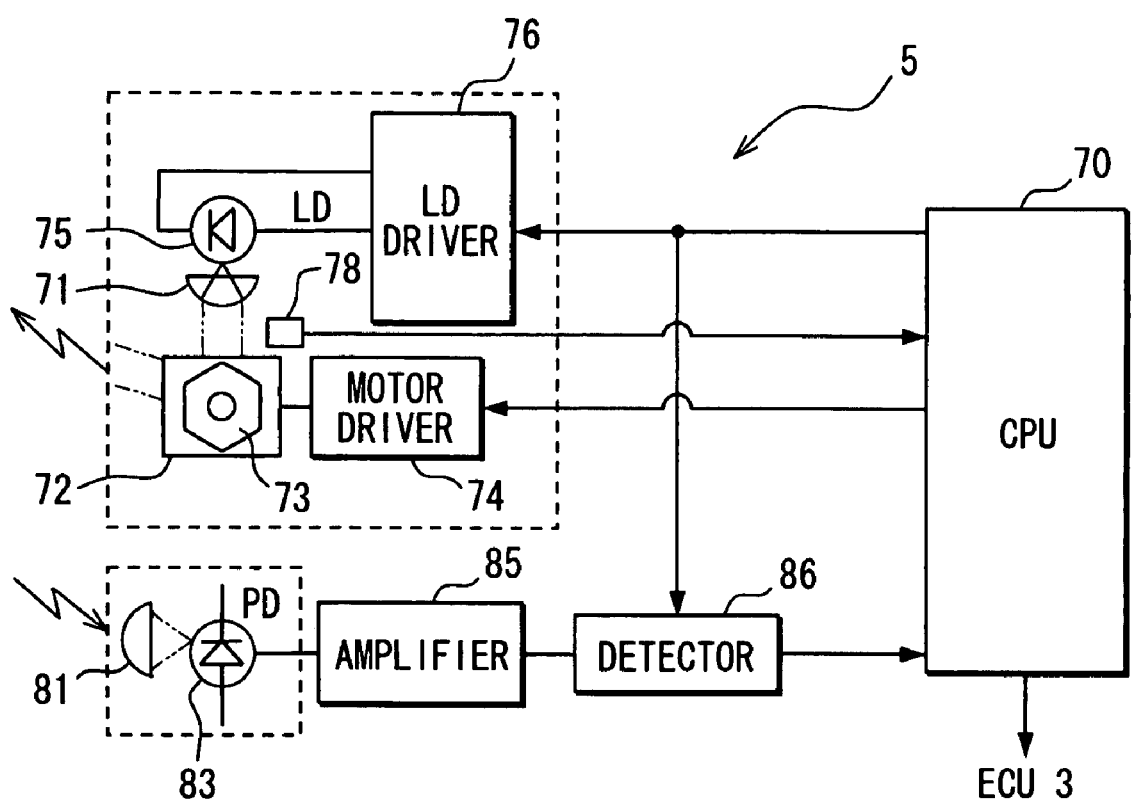
FIG. 2 is a block diagram showing a laser radar sensor in the vehicle control device.

The laser radar sensor 5 mainly includes, as shown in FIG. 2, a laser beam emission section, a laser beam receiving section, and a laser radar CPU 70. The laser beam emission section includes a semiconductor laser diode 75 that irradiates a pulsed laser beam through a laser beam emission lens 71 and a scanner 72. Further, the laser diode 75 is connected to the laser radar CPU 70 through a laser diode driver circuit 76, and irradiates or emits a laser beam according to a drive signal from the laser radar CPU 70. Also, the scanner 72 is equipped with a polygon mirror 73 rotatable about a vertical axis. When the drive signal from the laser radar CPU 70 is inputted to a motor driver section 74, the polygon mirror 73 is rotated by a drive force from a motor (not shown). The rotation position of the motor is detected by a motor rotation position sensor 78, and outputted to the laser radar CPU 70.

Because the polygon mirror 73 has six mirrors different in slant angle, the polygon mirror 73 is capable of outputting a laser beam so as to discontinuously scan the respective given angular ranges in the vehicle width direction (horizontal direction) and the vehicle height direction (vertical direction) with the laser beam. Thus, the laser beam is two-dimensionally scanned as shown in FIG. 4.

Figure 4:
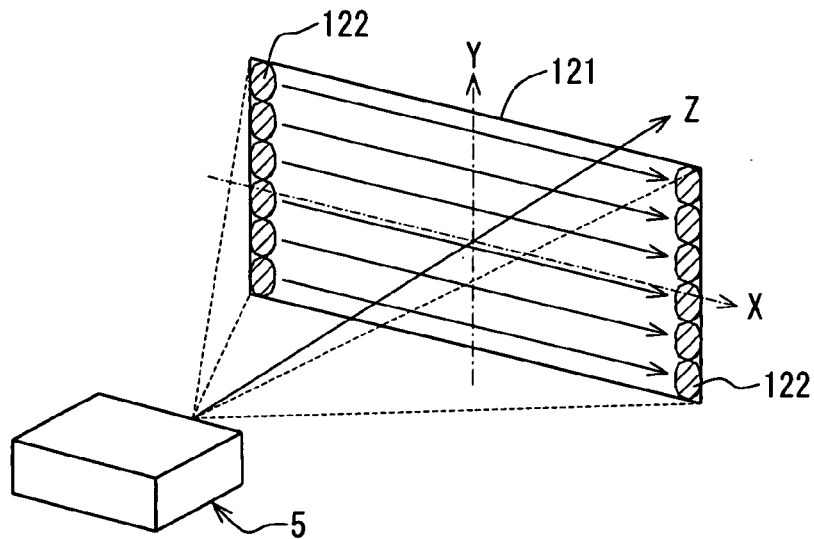
FIG. 4 is a perspective view showing an irradiation area of the laser radar sensor.

In FIG. 4, patterns 122 of the emitted laser beam show only a case in which the laser beam is emitted to the right end and the left end within a detection area 121 of the reflecting object, and the patterns between the right end and the left end are omitted in the figure. The emitted laser beam patterns 122 are substantially oval, but are not limited to this configuration, and can be rectangular. The embodiment is not limited to the scanning system but can be applied to a system that is capable of measuring two orientations in addition to the distance.

When the irradiation direction of the laser beam is a Z-axis, the laser beam is irradiated so as to sequentially scan an X-Y plane perpendicular to the Z-axis with the laser beam. In this embodiment, a Y-axis that is the height direction is a reference direction, and an X-axis that is the vehicle width direction is a scanning direction. The laser beam is irradiated by 327 points while shifting the scanning direction every given angle in the X-axis direction, and the irradiation of 327 points in the X-axis direction is repeated by six scanning lines in the Y-axis direction. Therefore, plural laser beams are irradiated in each of the scanning lines of a first scanning line to a sixth scanning line.

As described later, with the irradiation of the detection area 121 with the laser beam, in the case where a reflecting laser beam of the laser beam is received by the laser beam receiving section, the laser radar CPU 70 calculates scan angles θx and θy indicative of the irradiation angles of the laser beam, and a measured distance L, and then outputs calculated values to the control ECU 3. The two scan angles θx and θy are defined such that an angle between a line resulting from projecting the respective emitted laser beams onto a Y-Z plane and the X-axis is a vertical scan angle θy, and an angle between a line resulting from projecting the respective emitted laser beams onto an X-Z plane and the Z-axis is a horizontal scan angle θx.

Referring to FIG. 2 again, the laser beam receiving section of the laser radar sensor 5 is equipped with a condenser lens 81 that condenses the laser beam that is reflected by the reflecting object (not shown), and a laser beam receiving element (photodiode) 83 that outputs a voltage signal (laser beam receiving signal) corresponding to the intensity of the condensed reflecting laser beam. The laser beam receiving signal that is outputted by the laser beam receiving element 83 is amplified by an amplifier 85, and then inputted to a detector circuit 86 that detects the reflecting object on the basis of the laser beam receiving signal that has been converted into a digital signal.

Figure 3:
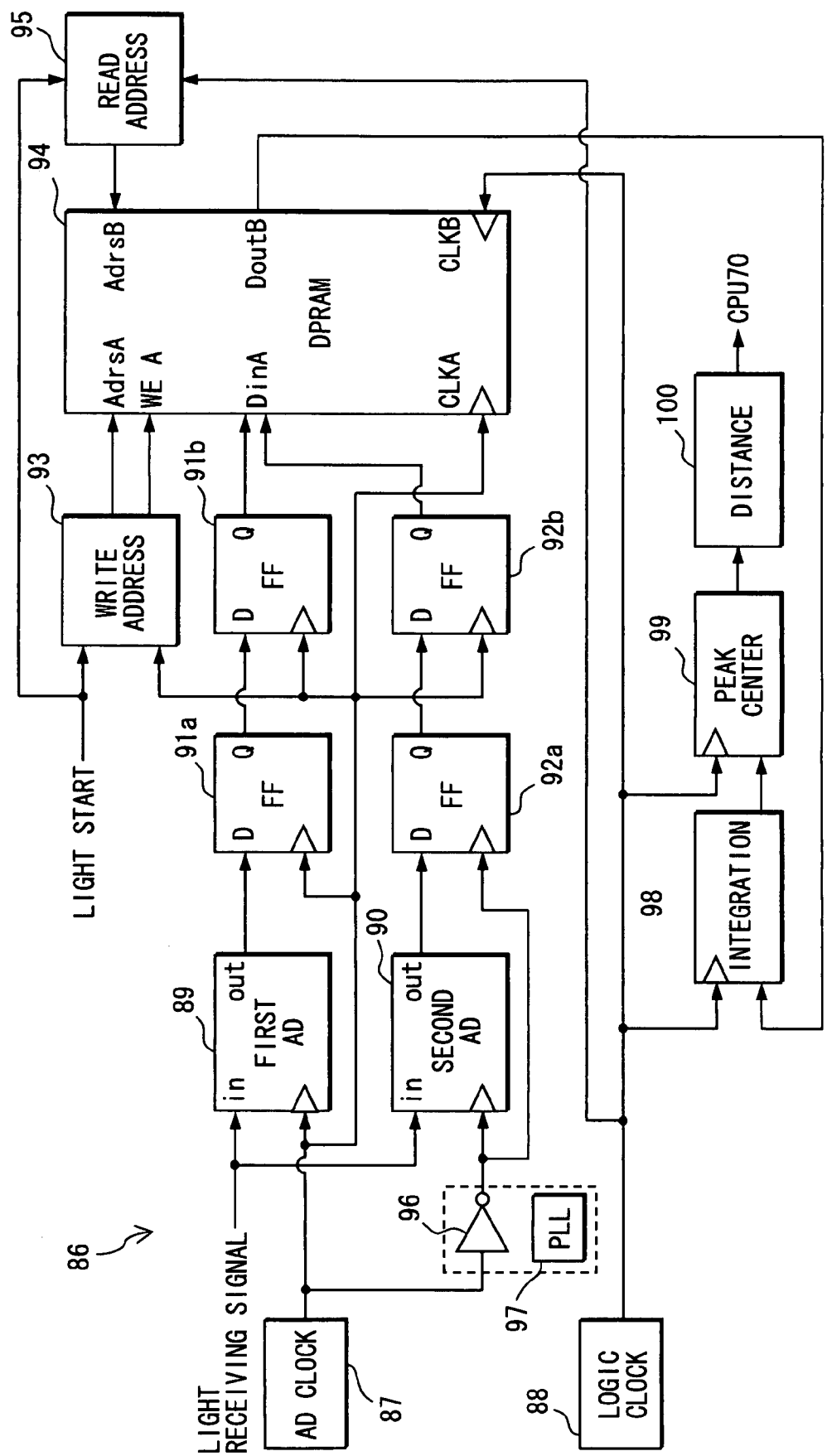
FIG. 3 is a circuit diagram showing a detector circuit in the laser radar sensor.

As shown in FIG. 3, the detector circuit 86 is made up of an AD clock generation circuit 87, a logic clock generation circuit 88, a first AD converter 89, a second AD converter 90, flip flop circuits (FF circuits) 91a, 91b, 92a and 92b, a write address generation circuit 93, a DPRAM (dual-port random access memory) 94, a read address generation circuit 95, an inverter 96, an integration circuit 98, a peak center calculation circuit 99, and a distance calculation circuit 100.

In this embodiment, while the limit of the upper limit of the sampling frequencies of the first AD converter 89 and the second AD converter 90 are maintained, sampling of the analog receiving signal is realized at the sampling frequency twice as high as the upper limit.

As described above, in the circuit used in the actual radar device, it is impossible to increase the sampling frequency unlimitedly, and there is the upper limit of the available sampling frequency due to the various limit on the circuit. Also, because there is a limit on a board of a microcomputer on which the AD converter is mounted (a limit caused by a drive frequency of an IC mounted on the board, or a limit on an EMC (electro-magnetic compatibility) in addition to the upper limit, there is a case in which sampling is conducted at a sampling frequency lower than the upper limit of the AD converter per se. Therefore, sampling cannot be conducted at a sampling frequency that exceeds a limit value that derives from the limit of the board or a limit value of the AD converter per se.

Figure 7:
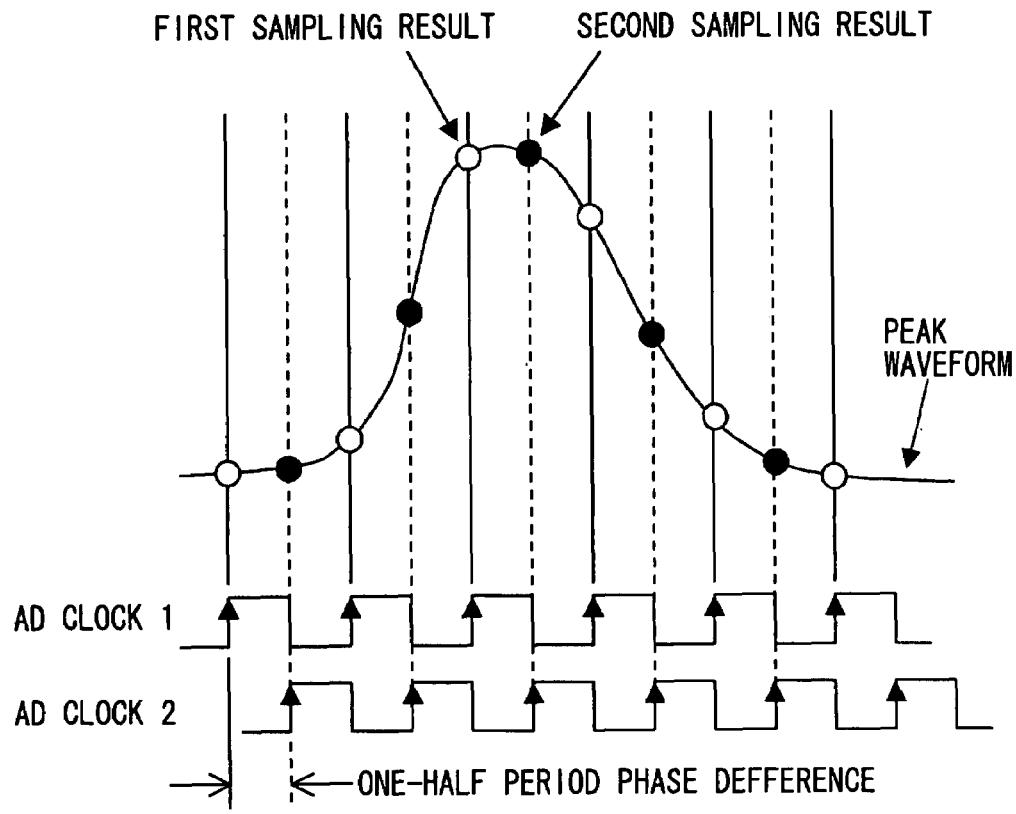
FIG. 7 is a graph showing a first sampling result in the case where a peak waveform is sampled by a first AD clock, and a second sampling result in which the peak waveform is sampled by a second AD clock.

In the detector circuit 86, the sampling at the sampling frequency twice as high as the limit value is enabled while the limit value of the sampling frequency is maintained with reference to FIG. 7. FIG. 7 shows a reflection peak waveform of the analog laser beam receiving signal. Referring to FIG. 7, vertical solid lines represent sampling timings of the first AD clock. As described above, the first AD clock is the maximum sampling frequency that enables the AD converter to be driven which derives from the limit on the board, and the AD conversion is realized at the leading timing of the first AD clock.

Cross points of the vertical solid lines and the reflection peak waveform of the receiving signal in FIG. 7 are portions at which the AD conversion is conducted. There are an AD converter that requires sample-hold and an AD converter that does not require sample-hold. The AD converting process with (or without) sample-hold starts at the leading edge of the first AD clock. Then, the AD converting process is completed before a subsequent AD clock rises.

Vertical broken lines in FIG. 7 represent sampling timings of a second AD clock that is identical in cycle and shifts in phase by half cycle with respect to the first AD clock. Cross points between the vertical broken lines and the reflection peak waveform are portions at which the AD conversion is conducted by the second AD clock. In this example, the second AD clock drives another AD converter that is different from the first AD clock (having the same performance). One AD converter cannot be driven by two AD clocks consisting of the first AD clock and the second AD clock.

In this example, when the AD conversion results of the first AD clock and the second AD clock in FIG. 7 (values of the cross points between the respective AD clocks and the reflection peak waveform) can be temporally alternately extracted into one AD conversion result, the same results as those when sampling is conducted at the frequency twice as high as the sampling frequency are apparently obtained. That is, the AD conversion is resultantly realized at the sampling frequency twice as high as the upper limit while the upper limit of the sampling frequency is used.

The circuit configuration shown in FIG. 3 realizes the above processing. The analog laser beam receiving signal outputted from the laser beam receiving element 83 which is amplified by the amplifier 85 is inputted to two AD converters (first AD converter 89 and second AD converter 90) shown in FIG. 3 at the same time. The first AD converter 89 and the second AD converter 90 have the same model and the same performance.

An AD sampling clock (AD clock) is outputted from an AD clock generation circuit 87. It is assumed that the AD clock that is outputted from the AD clock generation circuit 87 is the first AD clock. It is assumed that the duty ratio of the first AD clock is 50%. It is assumed that a clock having the same sampling cycle and shifting the phase by half cycle is the second AD clock. In order to generate the second AD clock on the basis of the first AD clock, it is necessary to input the first AD clock to the inverter 96 to shift the phase by half cycle. The phase shift conducted by the inverter 96 is not so much accurate as that by the PLL circuit (phase-locked loop) 97. However, it is easy to use the inverter 96 in the AD conversion when sampling having the phase shift with such precision suffers from no problem.

However, in the case where it is required to conduct sampling while the phase is precisely shifted by half cycle, the PLL circuit 97 is required. Therefore, in the circuit configuration of the detector circuit 86, it is determined whether the inverter 96 or the PLL circuit 97 is used according to a precision requirement of the phase shift which affects the sampling interval.

The first AD converter 89 executes sampling by the first AD clock, and the second AD converter 90 executes sampling by the second AD clock. A sample-hold circuit (S/H circuit), and a pre-filter for removing noises (high frequency distortion) are equipped within each of the first AD converter 89 and the second AD converter 90. The first AD converter 89 and the second AD converter 90 must be so configured as to conduct sampling by one type of sampling clock. It is possible to apply an AD converter that does not require the S/H circuit and the prefilter circuit.

The AD conversion results of the first AD converter 89 are stored in the FF circuit 91a at the leading timing of the first AD clock, and the AD conversion results of the second AD converter 90 are stored in the FF circuit 92a at the leading timing of the second AD clock. Each of the FF circuits 91a, 91b, 92a, and 92b has a data width with the number of bits sufficient to deal with the AD conversion results.

The FF circuits 91b and 92b succeeding of the preceding FF circuits 91a and 92a that are connected to the first AD converter 89 and the second AD converter 90, respectively, are connected with signal lines of the first AD clock, respectively. Data storage in the succeeding FF circuits 91b and 92b is executed by the first AD clock.

In this example, the storing process in the preceding FF circuit 92a is completed before the second AD clock falls, and the storage data that is outputted from an output (Q) terminal of the preceding FF circuit 92a is required to ensure a setup time (minimum time required to determine data to be stored in advance) from the viewpoint of timing with respect to the rising of the first AD clock that is inputted to the succeeding FF circuit 92b. This is because when the timing is not established, the recording in the succeeding FF circuit 92b is not successful.

At a time point when storage data that is outputted from the Q terminals of the preceding FF circuits 91a and 92a is stored in the succeeding FF circuits 91b and 92b, all of the AD conversion results that have been sampled at two different timings can be dealt with as data that have been sampled at the timing of the first AD clock.

Subsequently, the processing of those two different data will be described. As shown in FIG. 3, both of two different storage data that is outputted from the Q terminals of the succeeding FF circuits 91b and 92b are inputted to a data input terminal (DinA) at a port A side of the DPRAM 94 together. The port A side is directed to a left terminal of FIG. 3.

When it is assumed that a bit width of the storage data that is outputted from the Q terminals of the succeeding FF circuits 91b and 92b is M, a bit width of the data input terminal (DinA) at the port A side of the DPRAM 94 must be 2×M. That is, the storage data that are outputted from the succeeding FF circuits 91b and 92b are inputted to the DPRAM 94 as not separate data but a group of data at the same time, thereby making it possible to synchronize the inputs by one AD clock. As a specific beat width, because the normal AD conversion results are processed by 16 bits, the port A side input of the DPRAM 94 can set 16×2=32 bits as a unit of the input data. The port A side of the DPRAM 94 operates in synchronism with the first AD clock that is inputted to a CLKA terminal.

A write address (AdrsA terminal input at the port A side) of the outputs from the succeeding FF circuits 91b and 92b into the DPRAM 94, and a write enable signal (WEA terminal input) are generated by a write address generation circuit 93 and inputted to the DPRAM 94. In this situation, a write start timing of the AD conversion results (in other words, timings at which the write address and the write enable signal are outputted) is determined on the basis of a laser beam emission start signal from a laser radar CPU 70 as shown in FIG. 3. That is, the laser emission starts, and writing of data in the DPRAM 94 starts after a given period of time has been elapsed (the period may be zero). The elapsed time is determined according to a timing from which the waveform data of the laser beam receiving signal should be acquired.

As described above, those two AD conversion results that have been obtained from the first AD converter 89 and the second AD converter 90 are temporally stored (written) in the DPRAM 94 in synchronism with the first AD clock at the same time.

The AD conversion results that are temporally stored in the DPRAM 94 are outputted (read) from the port B side of the DPRAM 94 in order to conduct processing of the integration circuit 98. The port B side is directed to a right terminal of FIG. 3. The port B side operates in synchronism with a logic clock that is inputted to the CLKB terminal of the DPRAM 94. The logic clock is another clock independent from the AD clock. The logic clock is outputted from the logic clock generation circuit 88 shown in FIG. 3, and used in the integration circuit 98 and the peak center calculation circuit 99. The logic clock may be the same clock as the AD clock.

A timing at which the AD conversion results are outputted from the board B side of the DPRAM 94 is determined by the read address generation circuit 95. In this example, the read start timing is determined on the basis of the laser beam emission start signal as with the write address generation circuit 93 (read address is generated).

However, the reading operation in the DPRAM 94 must start always later than the writing operation in the DPRAM 94. The reason is because, in the case where the reading operation on the port B side and the writing operation on the port A side are conducted with respect to the RAM of the same address at the same time, the reading operation at the port B side is executed in an indefinite state before data that has been written on the port A side is determined, thereby making the reading results indefinite.

Accordingly, in the read address generation circuit 95, the reading operation on the port B side outputs a read address so as to start with a delay of a given time with respect to the writing operation on the port A side. It is necessary to start the reading operation after the first writing operation on the port A side has been completed. Because input of data in the succeeding integration circuit 98 is later as the delay time is more extended, it is necessary to appropriately set the delay time.

The bit width of the AD conversion results that are outputted from a DoutB terminal on the port B side of the DPRAM 94 must be not 2×M which is a bit width at the time of writing but M which is a bit width of the original AD conversion results. This is because the integration circuit 98 conducts a process of integrating data of the bit width M. Data reading operation is required to divide data resulting from bunching the outputs of the first AD conversion circuit 89 and the second AD conversion circuit 90 into two original data, and read the data twice.

Hence, the DPRAM 94 used in this embodiment has a bus width converting function of the port A side and the port B side so that the input bit width on the port A side is 2×M, and the output bit width on the port B side is a bit width M that is half of the input bit width. Specifically, data is processed under the conditions where the input bit width on the port A side is 32 bits unit, and the output bit width on the port B side is 16 bits unit.

Since data is read twice, it is necessary that the read address generation circuit 95 generates the read address so that the number of read data is twice as large as the number of write data. In the case where the same clock is inputted to the port A side and the port B side of the DPRAM 94, the reading operation requires the double time of the writing operation. However, in the case where to make the clock on the board B side twice as large as the clock on the port A side (logic clock is made twice as large as the AD clock) can be performed from the viewpoint of the circuit configuration of the detector circuit 86, it is possible to make the write time of the AD conversion results identical with the read time.

Accordingly, in order to apply this embodiment most effectively (at the highest speed), the sampling frequency of the AD converter is set as the upper limit, and logic clock is used at the frequency twice as high as the upper limit of the sampling frequency. Even though the logic clock is more than twice as high as the upper limit of the sampling frequency, the writing process of the AD conversion results does not catch up with the reading process in this case. As a result, the reading operation fails.

When data that is read from the DPRAM 94 is inputted to the integration circuit 98, the integration circuit 98 designates a given number of laser beam receiving signals corresponding to a given number of laser beams which are adjacently irradiated in the X-axis direction among data (laser beam receiving signal) which is AD conversion results of the analog laser beam receiving signals as a laser beam receiving signal range to be integrated. The integration circuit 98 calculates an integration signal (integrated laser beam receiving signal) of the laser beam receiving signals that belong to the designated range.

Figure 5:
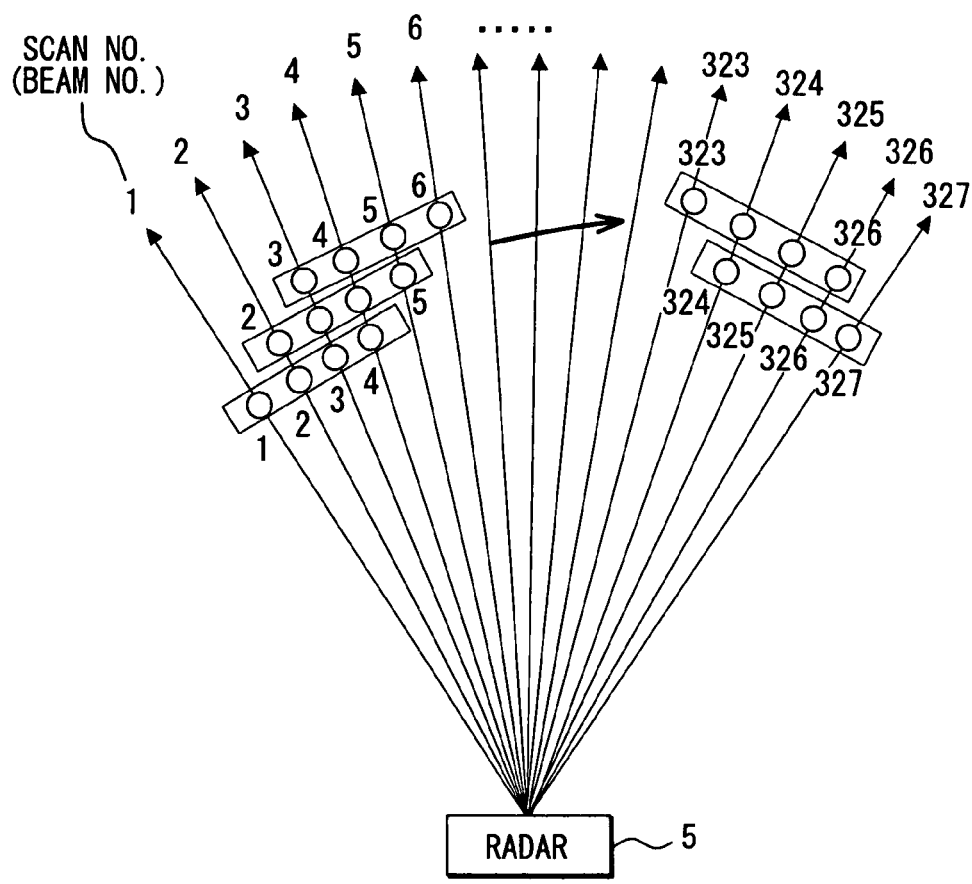
FIG. 5 is an explanatory diagram schematically showing an area of a receiving signal to be integrated in the case where an integrated laser beam receiving signal area is set to 4.

Next, the range and integration signal of the laser beam receiving signals to be integrated which are designated by the integration circuit 98 are described with reference to FIGS. 5 and 6. FIG. 5 schematically illustrates a range of the received signals that are to be integrated when the range of the receiving signals to be integrated is set to 4 by imparting beam numbers (scan numbers for the received signals) for the laser beams radiated being shifted by a predetermined angular range in the detection region 121. For easy explanation, FIG. 5 shows a laser beam of one scanning line only.

It may be attempted to detect the preceding vehicle by using the vehicle radar device of this embodiment. In this case, the preceding vehicle has a reflector on the rear surface thereof to highly reflect the laser beam. The vehicle body, too, reflects the laser beam relatively highly though it is not as high as that of the reflector. Usually, therefore, the laser beam reflected by the preceding vehicle is sufficiently intense, and it is possible to detect the preceding vehicle from the receiving signals of single reflected laser beam. However, when, for example, mud, snow and the like adheres to the rear surface of the preceding vehicle, the intensity of laser beam reflected by the preceding vehicle drops. In this case, therefore, it becomes probable that the preceding vehicle cannot be detected based on the individual receiving signals corresponding to laser beam reflected by the preceding vehicle.

Therefore, a plurality of receiving signals are integrated to amplify the receiving signals which are reflected by the preceding vehicle to detect even the reflected waves having small intensities. The integration circuit 98, first, specifies the receiving signals that are to be integrated. That is, as shown in FIG. 5, the integration circuit 98 specifies the receiving signals of a predetermined number corresponding to the laser beams of a predetermined number neighboring on the same scanning line (same plane) to be the receiving signals that are to be integrated. Specifically, the receiving signals of scan numbers 1 to 4 are specified as a line 1. Next, the receiving signal is changed or shifted by one signal, and the received signals of scan numbers 2 to 5 are specified as a line 2. Hereinafter in the same manner, the received signals of the neighboring four laser beams are successively specified up to a line 324.

Thus, integrated signals obtained by integrating the receiving signals belonging to the specified ranges are successively output in synchronism with specifying the range of the receiving signals to be integrated. Referring to FIG. 6, the integration is a processing for adding up (integrating) all digital values obtained by AD converting the four receiving signals at the same time. The four receiving signals to be integrated are indicated by a rectangle in FIG. 5. By integrating the predetermined number of the receiving signals, the S/N ratio of the receiving signals can be improved.

As described above, further, the integration circuit 98 moves the range of the receiving signals that are to be integrated by shifting the receiving signals one by one. This minimizes a decrease in the resolution of detection based on the integrated signals while integrating four receiving signals. That is, if the signals to be integrated are calculated by simply grouping the receiving signals output from the laser beam-receiving element 83 in a number of 4, the sensitivity for detecting the reflected laser beam can be improved but the resolution of detection by the integrated signals drops greatly. On the other hand, if the range of the received signals to be integrated is shifted by an amount of one receiving signal each time, a drop in the resolution of detection can be suppressed.

Figure 6:
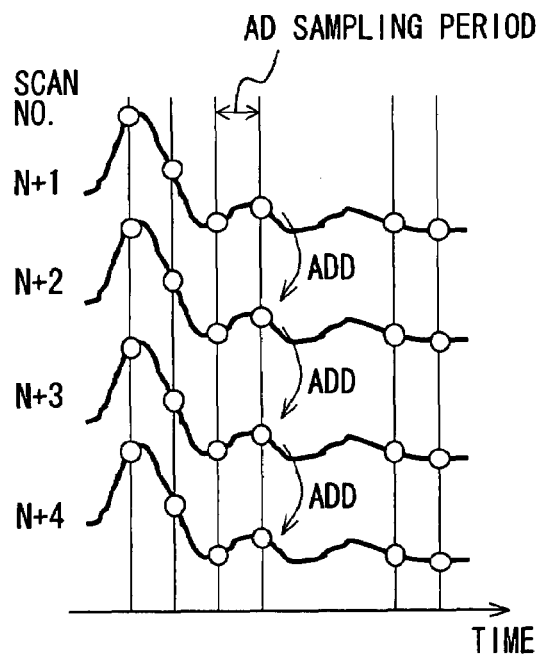
FIG. 6 is an explanatory diagram for explaining a process of integrating plural laser beam receiving signals.

In the description of using FIGS. 5 and 6, the range of the receiving signals to be integrated is set to be 4 which, however, is conveniently determined for easy explanation. Namely, the range of the receiving signals to be integrated, i.e., the number of the receiving signals to be integrated can be set to be any value depending upon the size of the object to be detected, angle between the neighboring laser beams and a maximum distance of detection.

The integration circuit 98 successively outputs the integrated signals obtained by integrating the receiving signals belonging to each of the ranges of the receiving signals to be integrated, i.e., successively outputs the integrated signals of each of the lines from the line 1 up to line (327−range of the receiving signals to be integrated+1) while shifting the range of the receiving signals to be integrated.

The peak center calculation circuit 99 estimates the peak center generation time in the integration signal to detect the peak center estimate time. A method of estimating the peak center estimate time will be described in brief. First, the peak center calculation circuit 99 detects the maximum intensity of the AD conversion results at the sampling points of the laser beam receiving signals (timings at which sampling is conducted by the AD conversion), and multiplies the maximum intensity by a given coefficient k (k is a coefficient lower than 1, for example, 0.5) as indicated by the following expression to set a threshold value Th.

$$Th = \text{Maximum intensity} \times k (0 < k < 1) \qquad \text{EX. 6}$$

When the threshold value is set by calculating the above Expression 6, the peak center calculation circuit 99 compares the threshold value with the intensities of the AD conversion results in each of the sampling points. With the above comparison, the peak center calculation circuit 99 detects the AD conversion results of two points between which the threshold value Th is interposed on two portions of a leading portion and a trailing portion of the laser beam receiving signal waveform, respectively. As a result, there are detected two points (t1, a1) and (t2, a2) between which the threshold value is interposed at the leading portion of the laser beam receiving signal waveform. Likewise, there are detected two points (t3, a3) and (t4, a4) between which the threshold value is interposed at the trailing portion of the laser beam receiving signal waveform. Reference ti (i=1, 2, 3, 4) represents a time from the laser beam emission start at the sampling points, and ai (i=1, 2, 3, 4) represents the AD conversion results at the sampling points.

Figure 8A:
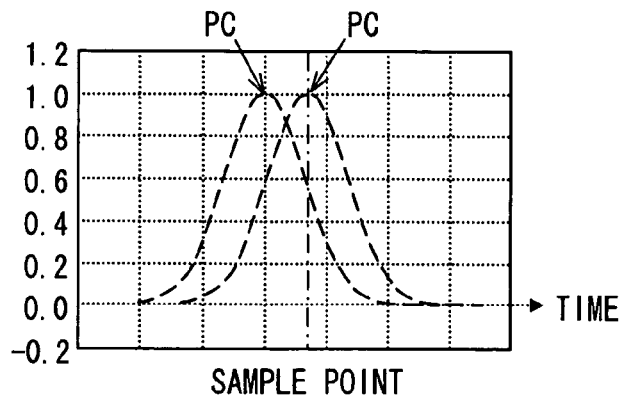
FIG. 8A is a graph showing models of two peak waveforms that are different in peak center positions using a Gauss waveform together.
Figure 8B:
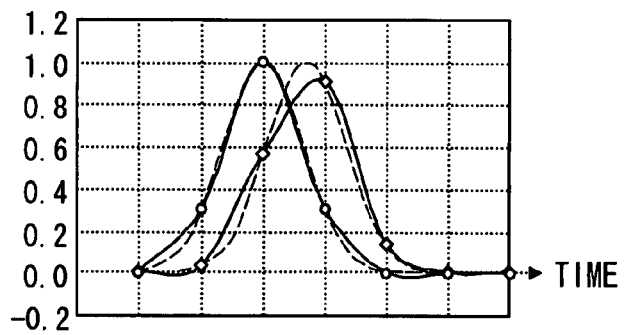
FIG. 8B is a graph showing AD conversion results of the waveform shown in FIG. 8A which are connected by an interpolation curve together with the original waveform.
Figure 8C:
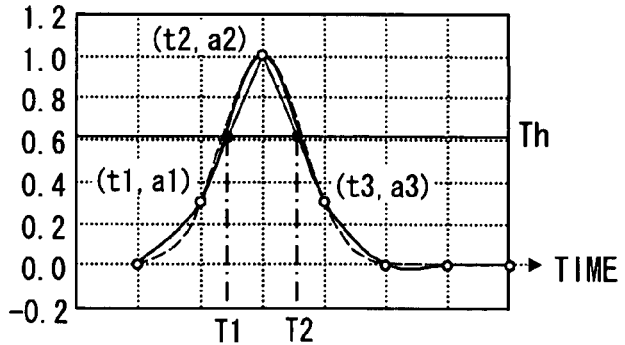
FIG. 8C is a graph showing the waveform whose peak center is sampled together with the threshold value set with respect to the waveform.
Figure 8D:
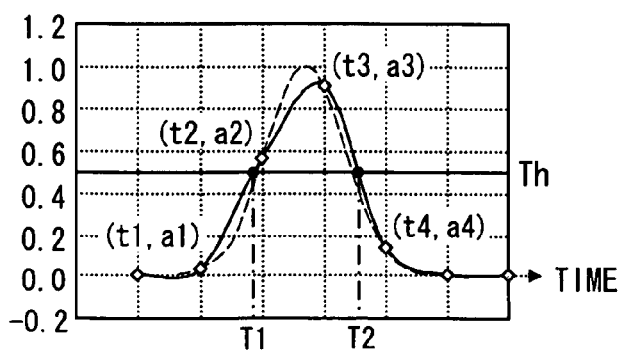
FIG. 8D is a graph showing the waveform whose peak center is not sampled together with the threshold value set with respect to the waveform
Figure 9A:
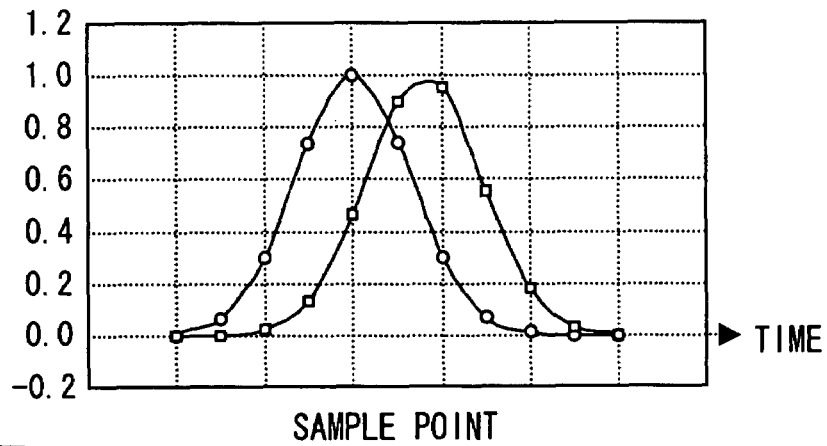
FIG. 9A is a graph showing sampling points in the case where the peak waveform shown in FIG. 8B is sampled at twice the sampling frequency.
Figure 9B:
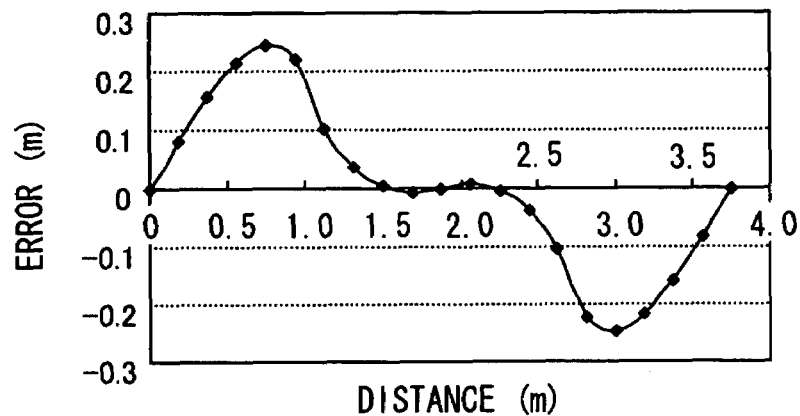
FIG. 9B is a graph in which a deviation time between the calculation results of Expression 4 in the case where sampling is conducted at sampling intervals shown in FIG. 8B and the actual peak center is converted into the distance.
Figure 9C:
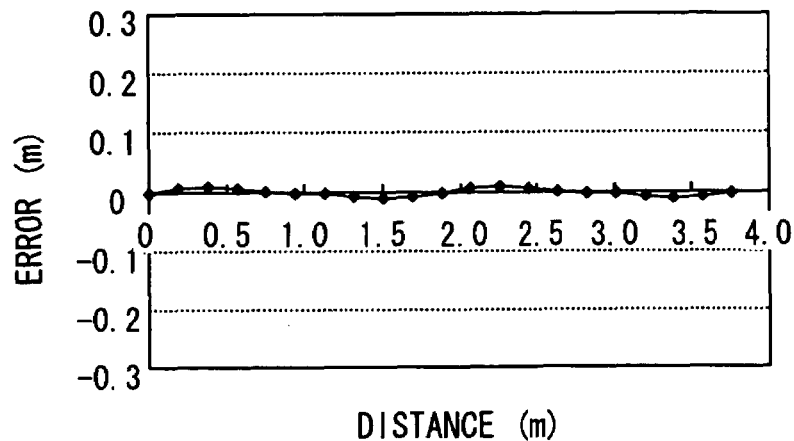
FIG. 9C is a graph in which a deviation time between the calculation results of Expression 4 in the case where sampling is conducted at twice the sampling intervals and the actual peak center is converted into the distance.

Then, a leading time T1 and a trailing time T2 when it is assumed that the waveform of the receiving signal crosses the threshold value are calculated by the aid of the four detected points. More specifically, as understood from FIG. 8D, the leading time T1 and the trailing time T2 are found by calculating the expression of linear interpolation represented by the following expression.

$$T1 = (Th - a1) \times (t2 - t1)/(a2 - a1) + t1 \qquad \text{Ex. 7}$$

$$T2=(a3-Th)\times(t4-t3)/(a3-a4)+t3 \quad \text{Ex. 8}$$

The generation time of the peak center PC is estimated by calculating the following expression on the basis of the calculation results of the leading time T1 and the trailing time T2.

$$\text{Peak center estimate time}=(T1+T2)/2 \quad \text{Ex. 9}$$

The distance calculation circuit 100 calculates a distance to the reflecting object on the basis of a period of time since the laser emission start till the peak center estimate time by using the peak center estimate time that is calculated in the peak center calculation circuit 99. The calculated distance to the reflecting object is outputted to the laser radar CPU 70.

The laser radar CPU 70 forms position data based on the distance to the reflecting object input from the distance calculation unit 100 and on the scanning angles θx and θy of the corresponding laser beams. Specifically, from the distance and the scanning angles θx and θy, the position data of the reflecting object are calculated on the XYZ rectangular coordinate system with the center of laser radar as an origin (0, 0, 0), the direction of vehicle width as X-axis, the direction of car height as Y-axis, and the direction toward the front of the vehicle as Z-axis. The position data in the XYZ rectangular coordinate system are output as distance data to the distance control ECU 3.

When the distance to the reflecting object is to be calculated based on the integrated signal, the scanning angle θx of the laser beam corresponding to the integrated signal is the scanning angle θx of the laser beam at the central position among the plurality of laser beams corresponding to the plurality of integrated receiving signals.

The distance control ECU 3 executes inter-vehicle distance control by recognizing the reflecting object based on the distance data from the laser radar sensor 5, and by controlling the vehicle speed by sending drive signals to the brake actuator 19, throttle actuator 21 and automatic transmission control unit 23 to meet the conditions of the preceding vehicle obtained from the recognized object. An alarm determining processing is also executed to produce an alarm in case the recognized object is staying in a predetermined alarm region for a predetermined period of time. The object in this case may be a vehicle traveling in front or a vehicle that is at rest ahead.

The distance ECU 3 will now be briefly described. The distance data output from the laser radar sensor 5 are sent to an object recognition block 43. Based on the three-dimensional position data obtained as the distance data, the object recognition block 43 calculates a central position (X, Y, Z) of the object, and a size (W, D, H) of the object such as width W, depth D and height H. Based on a change in the central position (X, Y, Z) with the passage of time, further, a relative speed (Vx, Vy, Vz) of the object is calculated with the position of the subject (own) vehicle as a reference. The object recognition block 43 further discriminates whether the object is at rest or is moving relying upon the vehicle speed (speed of the subject vehicle) output from the vehicle speed calculation block 47 based on the value detected by the vehicle sensor 7 and upon the relative speed (Vx, Vy, Vz) calculated above. Based on the result of discrimination and the central position of the object, objects are selected that affect the traveling of the subject vehicle, and the distances are displayed on the distance display unit 15.

Further, based on a signal from the steering sensor 27, a steering angle calculation block 49 calculates a steering angle and based upon a signal from the yaw-rate sensor 28, a yaw-rate calculation block 51 calculates a yaw-rate. Further, a curve radius (radius of curvature) calculation block 57 calculates a radius of curve (radius of curvature) R based on the vehicle speed from the vehicle speed operation block 47, steering angle from the steering angle calculation block 49 and yaw-rate from the yaw-rate calculation block 51. Based on the curve radius R, central position coordinate (X, Z), etc., the object recognition block 43 determines the probability in that the object is a vehicle and the probability in that the object is traveling in the same lane as the subject vehicle. An abnormal sensor detector block 44 detects any abnormal value of data calculated by the object recognition block 43. When the data have abnormal values, this fact is displayed on the abnormality indicator unit 17.

A block 53 for determining a preceding vehicle selects the preceding vehicle based on a variety of data obtained from the object recognition block 43, and calculates a distance Z to the preceding vehicle in the direction of Z-axis and a relative speed Vz. Then, a block 55 for controlling the inter-vehicle distance and for determining the alarm, determines whether an alarm be produced when it is the alarm determination or determines the content of vehicle speed control when it is the cruise determination, based on the distance Z to the preceding vehicle, relative speed Vz, preset state of the cruise control switch 26, state in which the brake switch 9 is depressed, position from the throttle position sensor 11 and a sensitivity setpoint by the alarm sensitivity setting unit 25. When the alarm must be produced, an alarm generating signal is output to the alarm sound generator 13. When it is the cruise determination, control signals are sent to the automatic transmission control unit 23, to the brake actuator 19 and to the throttle actuator 21 to effect the required control operations. When these control operations are executed, required display signals are output to the distance display unit 15 to notify the conditions to the driver.

As described above, the sampling frequency of the AD conversion is apparently increased by the radar device according to this embodiment, thereby making it possible to enhance the time resolution (to shorten the intervals between the sampling times). Accordingly, it is possible to reduce an error in the calculated distance which is attributable to the sampling frequency of the AD conversion.

The present invention is not limited to the above embodiments, but can be implemented in various embodiments as exemplified in the following modifications.

(First Modification)

In the above embodiment, sampling of the AD conversion in the radar device is exemplified, but the present invention can be applied to a device using a general AD conversion. For example, it is also applicable to a device that cannot dramatically increase the sampling frequency of the AD conversion by the limit to the circuit configuration.

(Second Modification)

With the application of a field programmable gate array (FPGA), the processing circuits (FF circuits 91a, 91b, 92a, 92b, write address generation circuit 93, DPRAM 94, read address generation circuit 95, integration circuit 98, peak center calculation circuit 99, and distance calculation circuit 100) succeeding to the first AD converter 89 and the second AD converter 90 can be configured within the FPGA. As a result, all of the processing circuits including the DPRAM 94 can be configured within one PFGA, and can be realized in a simple circuit.

(Third Modification)

The above embodiment realizes that the sampling frequency is doubled. The sampling frequency can be further increased four times as large as the normal frequency. In this case, three clocks that are shifted by 1/4 cycle period with respect to the reference AD clock are generated. Four AD converters are driven by four kinds of clocks that are shifted by 0/4, 1/4, 2/4, and 3/4, separately. The analog laser beam receiving signals are inputted to the four AD converters at the same time, and the outputs of the four AD converters are stored in four first-stage flip-flops by the respective four kinds of clocks. Then, the first-stage flip-flop outputs of 0/4 and 2/4 clocks are stored in the two second-stage flip-flops by the 0/4 clock. Also, the first-stage flip-flop outputs of 1/4 and 3/4 clocks are stored in the two second-stage flip-flops by 1/4 clock.

All of the outputs of the four second-stage flip-flops are stored in the four third-stage flip-flops by 0/4 clock. The outputs of the third-stage flip-flops are written in the DPRAM 94 by 0/4 clock at the same time. The DPRAM 94 executes writing operation and reading operation by different ports, independently, and has a data width conversion function between the ports.

That is, the writing operation is made by writing a data width having four continuous data at the same time. The reading operation is made by the bit unit having the width 1/4 as large as the write bit width in four times. When it is assumed that the AD conversion result is 16 bits, the writing operation is made in the DPRAM 94 by 16×4=64 bits unit together at the same time, and the reading operation is made by 16-bits unit in four times.

In this example, since the reading operation can be conducted by using another clock independent from the AD clock used in the writing operation, the efficiency of data flow is the highest in the case where the read clock can be increased four times as large as the AD clock.

With the application of the above configuration, it is possible to apparently increase the sampling frequency by four times. In the same manner, it is possible to further increase the multiples of the sampling frequency.

(Fourth Modification)

The above embodiment has dealt with an example of integrating the receiving signals based on a plurality of laser beams radiated neighboring one another among the scanning lies scanned in the direction of X-axis. However, a predetermined number of receiving signals may be integrated within a predetermined period of time, that are output based on the transmission waves radiated over a predetermined angle. In this case, too, the signal components corresponding to the waves reflected by the reflecting object are amplified. Here, however, random noise components that are superposed on the receiving signals due to various factors are amplified to a small degree. Therefore, the integrated signals feature an improved S/N ratio of the received signal components to the waves reflected by the reflecting object.

(Fifth Modification)

In the above embodiment, the integration circuit 98 has shifted the range of the receiving signals to be integrated by one receiving signal each time. However, the range of the receiving signals to be integrated may be shifted each time by a plurality of received signals which is not larger than the number of the receiving signals to be integrated. In this case, too, the resolution for detecting the integrated signals can be improved as compared to when the received signals are, at least, grouped in a predetermined number to calculate an integrated signal therefrom.

(Sixth Modification)

The above embodiment has dealt with an example of integrating the receiving signals based on a plurality of laser beams radiated neighboring one another among the scanning lies scanned in the direction of X-axis. However, the receiving signals to be integrated are not limited to those of the laser beams radiated neighboring one another in the X-axis direction but may be those of the laser beams radiated neighboring one another in the Y-axis direction. Further, the range of laser beams radiated neighboring one another may cover a plurality of scanning lines in the directions of X-axis and Y-axis.

(Seventh Modification)

The above embodiment has employed the laser radar sensor 5 using a laser beam. However, it is also allowable to use electromagnetic waves such as millimeter waves or ultrasonic waves. However, there is no need to stick to the scanning system only, and there may be employed any system for measuring the azimuth in addition to the distance. When there is used, for example, an FMCW radar or a Doppler radar with millimeter waves, there are obtained the data of distance to the preceding vehicle and the data of relative speed of the preceding vehicle at one time from the reflected waves (received waves). Therefore, no step is necessary for calculating the relative speed based on the distance data, that is required when the laser beams are used.

(Eighth Modification)

In the above embodiment, integrated signals are calculated by integrating a plurality of receiving signals in order to detect even those reflecting objects that reflect the laser beam insufficiently. The reflecting objects, however, may be detected based upon the individual receiving signals.

What is claimed is:

1. A signal processing apparatus comprising:
AD clock generating means for generating an AD clock used for sampling of AD conversion to generate a plurality of AD clocks that are equal in frequency and different in phase;
a plurality of AD converting means each of which inputs the AD clocks that are different in phase from each other for AD converting an analog signal into digital signals at a timing of inputted AD clock;
a plurality of first storage means for storing data of respective AD conversion results that are converted by the respective AD converting means at a timing of the same clock as any one of the AD clocks that are inputted by the respective AD converting means, separately;
a plurality of second recording means for storing respective data that are stored by the respective first recording means at a timing of the same clock as the clock used in one of AD converting means, separately;
data reading/writing means that executes writing and reading of data for writing the respective data stored by the respective second recording means as a group of data at a timing of the same clock as the clock used in the plurality of second recording means, and divides the group of written data into the respective data for reading the respective data at a timing of the different clock from the clock used in writing the data in the number of times corresponding to the number of divided data; and
signal processing means for executing given signal processing by using the respective data read by the data reading/writing means at a timing of the same clock as the clock used in reading the data by the data reading/writing means.

2. The signal processing apparatus according to claim 1, wherein
the data reading/writing means writes the data as data having a bit width a plurality of times as large as a bit width of the data used in the signal processing means in writing the respective data stored in the respective second recording means as a group of data.

3. The signal processing apparatus according to claim 1, further comprising:
radar means for irradiating a transmitting wave within a given angle range to output a receiving signal corresponding to intensity of a reflected wave when receiving the reflected wave of the transmitting wave,
wherein the plurality of AD converting means converts the analog receiving signals outputted by the radar means into digital signals, and
wherein the signal processing means includes peak center time calculating means and distance calculating means, the peak center time calculating means calculating a peak center time of the receiving signal on the basis of the respective data read by the data reading/writing means, and the distance calculating means calculating a distance to the reflecting object on the basis of a period of time since a start of irradiation of the transmitting wave from the radar means till the peak center time calculated by the peak center time calculating means.

4. The signal processing apparatus according to claim 3, wherein:
the radar means irradiates a plurality of transmitting waves toward different directions within the given angle range,
the signal processing means further includes setting means and integrating means, the setting means setting a data range to be integrated from a given number of data corresponding to a given number of receiving signals that are outputted on the basis of a given number of transmitting waves that are adjacently irradiated from the radar means to set a plurality of data ranges to be integrated while shifting data corresponding to the receiving signals that belong to the data range to be integrated by the number smaller than the given number so as to belong to the plurality of data ranges to be integrated where data corresponding to parts of the receiving signals are superimposed on each other, and the integrating means for integrating data corresponding to a given number of receiving signals that belong to the plurality of data ranges to be integrated which are set by the setting means to output the integration data corresponding to the integration signal, and
the peak center time calculating means calculates the peak center time of the integration time.

5. The signal processing apparatus according to claim 3, wherein:
the radar means irradiates the transmitting wave toward a given angle within the given angle range;
the signal processing means further includes integrating means for integrating a plurality of data corresponding to a plurality of receiving signals that are outputted from the radar means to output integration data corresponding to the integration signal; and
the peak center time calculating means calculates the peak center time of the integration signal.

\* \* \* \* \*